No. 60,513. PATENTED DEC. 18, 1866.
S. HEFLEBOWER & J. M. REED.
GRAIN SEPARATOR.
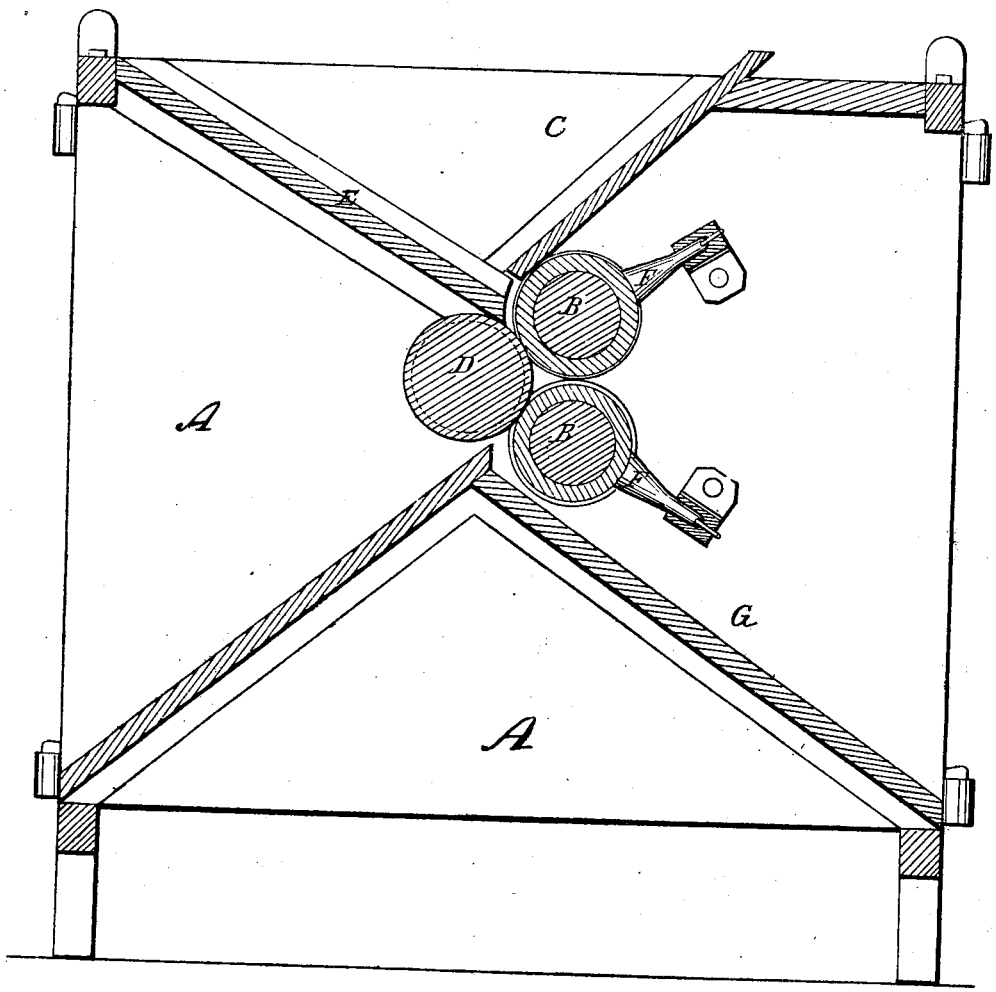
Witnesses.
Edward H. Knight
Thomas J. Hurdle.
Inventors
S. Heflebower
John M. Reed
by Munn & Co.
atty.

United States Patent Office.

IMPROVEMENT IN GRAIN SEPARATOR.

S. HEFLEBOWER, OF ALEXANDRIA, AND J. M. REED, OF LOUDON COUNTY, VIRGINIA.

Letters Patent No. 60,513, dated December 18, 1866.

The Schedule referred to in these Letters Patent and making part of the same.

TO ALL WHOM IT MAY CONCERN:

Be it known that we, SAMUEL HEFLEBOWER, of Alexandria, county of Alexandria, and State of Virginia, and JOHN MILTON REED, of the county of Loudon, and State of Virginia, have invented a new and improved Machine for Separating Cockle from Wheat; and we do hereby declare the following to be a full, clear, and exact description of the same, sufficient to enable one skilled in the art to which our invention appertains, to make and use the same, reference being had to the accompanying drawings, forming part of this specification, and in which our invention is represented by a vertical section.

The grain is passed between a pressure-roller and one or more rollers surfaced with a substance to which the cockle alone will adhere; the cockle is brushed from the rollers at a succeeding part of their revolution, so as to re-prepare them for duty. The composition consists of a mixture of glue and molasses forming a solid roller or a covering only for a central drum, and springs are adapted to the journals of the feed-roller so as to bring it with the required force against the elastic rollers to partially imbed the filaments, or spines, or the cockle whereby it is attached to the surface of the composition roller, while the smooth-surfaced wheat is not fastened thereto.

In the drawings, A A is the frame in which the rollers are mounted; B B are two rollers covered with an elastic substance to which the rough-coated cockle will adhere, while it is not sufficiently sticky or tenacious to retain the wheat which passes from the feed-hopper, C, between the elastic-surfaced rolls, B, and the pressure-roller, D, whose pressure is regulated by springs or other arrangements applied to its journals, or to the bar in which it is journalled. Several rolls, B B, may be applied around one-half of the circumference of the pressure-roll, D, and the wheat and cockle passing between the pressure-roll and the rolls B, in succession, as has been said, the cockle adheres and the wheat does not; the wheat passes down the inclined board, E, and the cockle, being carried to the other side, is removed by the brushes F, and drops on to the board G, which discharges it from the machine to the appropriate receptacle. The composition on the rolls consists of a mixture of glue and molasses, or it may be made of other materials of about the same tenacity and adhesiveness. The rolls may be rotated by gearing or bands.

Having described our invention, what we claim as new, and desire to secure by Letters Patent, is—

The combination of a pressure-roller with one or more rollers with an adhesive covering to which the cockle will become attached, and thereby removed from the wheat, substantially as described.

To the above specification of our improvement in cockle-separating machine we have signed our hands this 15th day of October, 1866.

SAML. HEFLEBOWER,
JOHN MILTON REED.

Witnesses:
T. C. CONNOLLY,
EDWARD H. KNIGHT.